US010419945B2

(12) United States Patent
Abiri et al.

(10) Patent No.: US 10,419,945 B2
(45) Date of Patent: Sep. 17, 2019

(54) COMMUNICATION NETWORK CONTROLLER AND METHOD

(71) Applicant: Intel IP Corporation, Santa Clara, CA (US)

(72) Inventors: Roni Abiri, Raanana (IL); Segev Ravgad, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 67 days.

(21) Appl. No.: 15/475,334

(22) Filed: Mar. 31, 2017

(65) Prior Publication Data

US 2018/0288626 A1 Oct. 4, 2018

(51) Int. Cl.
*H04W 16/18* (2009.01)
*H04W 24/02* (2009.01)
*H04W 88/12* (2009.01)

(52) U.S. Cl.
CPC .......... *H04W 16/18* (2013.01); *H04W 24/02* (2013.01); *H04W 88/12* (2013.01)

(58) Field of Classification Search
CPC ............................ H04W 16/18; H04W 24/02
See application file for complete search history.

(56) References Cited

U.S. PATENT DOCUMENTS

| 5,668,562 | A | 9/1997 | Cutrer et al. |
| 2006/0046646 | A1 | 3/2006 | Couper |
| 2007/0121560 | A1* | 5/2007 | Edge ............... H04W 64/00 370/338 |
| 2013/0072110 | A1* | 3/2013 | Gunnarsson ........ H04B 7/155 455/7 |
| 2017/0026864 | A1 | 1/2017 | Mahasenan et al. |
| 2017/0041807 | A1 | 2/2017 | Lotter |
| 2017/0150371 | A1* | 5/2017 | Cichonski ......... H04B 17/318 |
| 2017/0181006 | A1* | 6/2017 | Vardarajan ........ H04W 16/20 |
| 2017/0303138 | A1* | 10/2017 | Barmettler ........ H04W 16/18 |
| 2017/0338883 | A1* | 11/2017 | Clarke ............... H04B 7/15 |

OTHER PUBLICATIONS

Search Report dated May 15, 2018 for International Application No. PCT/US18/13866.

* cited by examiner

*Primary Examiner* — Charles C Jiang
*Assistant Examiner* — Ryan C Kavleski
(74) *Attorney, Agent, or Firm* — Schiff Hardin LLP

(57) ABSTRACT

A network controller of a communication network that serves one or more communication devices controls placement of one or more communication devices, such as a range extender, in the communication network. The network controller can control a communication device (e.g., a mobile device) and an access point serving the communication device to measure one or more wireless characteristics to generate first and second measurement information, respectively. The network controller can determine a placement score based on the first measurement information and the second measurement, and determine a placement location of the ranger extender within the communication network based on the placement score. The network controller can provide the placement location to the communication device and/or the range extender to indicate the placement location in which the range extender is to be positioned within the communication network.

24 Claims, 6 Drawing Sheets

COMMUNICATION NETWORK CONTROLLER AND METHOD

BACKGROUND

Field

Aspects described herein generally relate to communication system management, including determine placement of wireless access points and/or range extenders.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
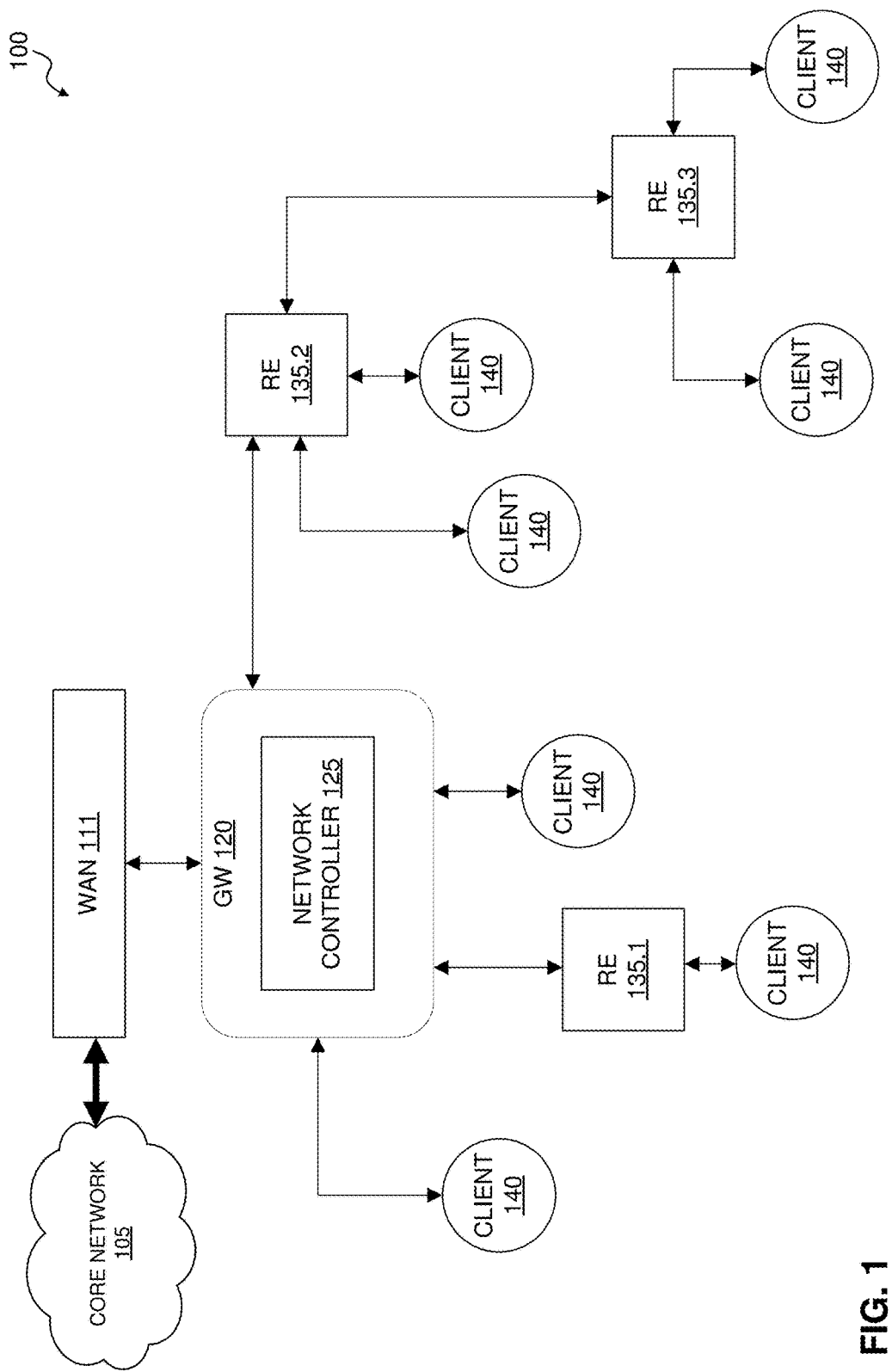
FIG. 1 illustrates a communication network management system according to an exemplary aspect of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, wireless communication networks can include one or more wireless client devices (e.g., clients, stations, or mobile devices) served by one or more wireless access points (e.g., gateways), whose wireless range can be extended by one or more wireless range extenders deployed in the wireless communication environment. Communication systems can be configured to determine position of the wireless range extender(s) based on the analysis of measurement information (from one or more measurement operations) associated with one or more wireless characteristics of the client device(s), access point(s), and/or range extender(s), including measurements of wireless communications between two or more components (e.g., client devices, access points, and/or range extenders) of the communication network.

In exemplary aspects, the one or more wireless characteristics can include path loss, signal strength (e.g., received signal strength indicator (RSSI)), spectrum availability of backhaul communications and/or of serving-side communications, supported frequency bands, supported communication technologies/protocols, network congestions, interference, throughput, one or more quality of service (QoS) parameters, and/or one or more other wireless characteristics as would be understood by one of ordinary skill in the art.

In exemplary aspects of the present disclosure, a wireless communication system can include a network controller that is configured to manage and control placement of one or more range extenders (RE) and/or one or more other devices within the system. The range extenders (RE) are positioned relative to one or more gateways (GW) and/or one or more other REs, and configured to extend the wireless service range of the GW(s) and/or REs positioned higher within the hierarchal relationship of the GW(s) and REs. The REs can be configured to serve one or more wireless clients of the wireless communication system or one or more underlying REs. The gateway (GW) can also be referred to as an access point (AP). The network controller can be configured to determine locations to place one or more REs as well as to increase and/or optimize performance of some or all nodes (GWs, REs, and/or clients) including the communication backhaul. The wireless communication system, including the GW(s), REs, and/or clients can utilize multiple frequency bands (e.g., 2.4 GHz, 5 GHz) for backhaul and service of clients, but are not limited thereto.

In an exemplary aspect, the network controller can be configured to receive measurement information associated with one or more wireless characteristics from one or more clients, one or more GWs and/or one or more REs, and determine locations (e.g., optimal locations) for the placement of one or more REs (and/or the GW and/or other GWs) within the communication system environment based on the measurement information. In an exemplary aspect, the network controller can generate position information (also referred to as placement control information) indicative of the location for placement of one or more REs (and/or GWs). The network controller can use a secured in-band signaling protocol between the access points (gateway) and the REs to exchange the measurement information and/or control signals.

In addition to the GW or RE serving the wireless client, the network controller can be configured to control one or more other GWs and/or REs (e.g., all others, all others within range, etc.) to measure one or more wireless characteristics (e.g., path loss, signal strength, etc.) between the wireless client and/or obtain wireless characteristics measured by and from the wireless client. In an exemplary aspect, an application running on the wireless client can measure the wireless characteristics (e.g., based on instructions from the network controller)

FIG. 1 illustrates a communication network management system 100 according to an exemplary aspect of the present disclosure.

The system 100 can include a core network 105, a wide-area network (WAN) 111, one or more gateways (GW) 120 (also referred to as access points (APs)), one or more range extenders (RE) 135 (or more generally "range extenders (RE)"), and one or more clients 140. Clients 140 can also be referred to as stations, mobile devices, or communication devices. As illustrated in FIG. 1, the GW 120 includes a network controller 125, but is not limited to this configuration. For example, the network controller 125 can instead be implemented within the WAN 111, an RE 135, or a client 140.

In an exemplary aspect, the network controller 125 can be comprised in one or more components, such as in the core network 105 and/or the WAN 111 in addition to, or alternatively to, being comprised in the GW 120. For example, the network controller 125 can be comprised in two or more components in a distributed deployment, where the processing of the network controller 125 can be distributed among the components. In some aspects, the network controller 125 is hosted within the core network 105 as a cloud-computing device. In other aspects, the network controller 125 can be alternatively or additionally comprised within one or more REs 135 and/or one or more clients 140.

In exemplary aspects, the components of the system 100 can operation based on a master-slave relationship. For example, the RE 135.3 can be a slave to the RE 135.2. The RE 135.2 can also be a slave to the GW 120 operating as a master. Further, the network controller 125 can be a master to all components of the system 100 in one or more exemplary aspects. The master-slave relationships of the components can define a hierarchal arrangement.

Examples of a client include (but are not limited to) a mobile computing device—such as a laptop computer, a tablet computer, a mobile telephone or smartphone, a "phablet," a personal digital assistant (PDA), and mobile media player; Internet-of-Things (IoT) devices (e.g., smart-building sensors, devices); and a wearable computing device—such as a computerized wrist watch or "smart" watch, and computerized eyeglasses. In some aspects of the present disclosure, the client 140 may be a stationary communication device, including, for example, a stationary computing device—such as a personal computer (PC), a desktop computer, a computerized kiosk, and an automotive/aeronautical/maritime in-dash computer terminal.

In an exemplary aspect, the core network 105 and/or the WAN 111 include one or more well-known communication components—such as one or more network switches, one or more network gateways, and/or one or more servers. The backhaul communication network can include one or more devices and/or components configured to exchange data with one or more other devices and/or components via one or more wired and/or wireless communications protocols. These devices/components can include processor circuitry configured to perform their respective functions.

In exemplary aspects, the gateway 120, REs 135, and clients 140 communicate with one or more service providers via the WAN 111 and the core network 105. In an exemplary aspect, the core network 105 is an internet protocol (IP) backhaul network, but is not limited thereto. The number of GWs 120, REs 135, and clients 140 are not limited to the quantities illustrated in FIG. 1, and the system 100 can include any number of the various components as would be understood by one of ordinary skill in the relevant art(s). For example, the system 100 can include another GW 120 connected to the WAN 111 and that serves one or more other REs 135 and/or clients 140.

The GWs 120, REs 135, and client(s) 140 can each include one or more transceivers configured to transmit and/or receive communications via one or more wireless and/or wired technologies within the communication system 100. In an exemplary aspect, the GWs 120, REs 135 and clients 140 are configured to wireless communicate using one or more protocols defined in, for example, Institute of Electrical and Electronics Engineers' (IEEE) 802.11 specification, such as IEEE 802.11ac, but is not limited thereto. The GWs 120, REs 135 and clients 140 can be configured to communicate using one or more frequency bands, including, for example, 2.4 GHz and 5 GHz, but are not limited thereto. In an exemplary aspect, the GWs 120, REs 135 and clients 140 can be configured to additionally and/or alternatively communicate using one or more 4G (e.g., LTE) and/or 5G wireless technologies.

The GWs 120, REs 135 and client(s) 140 can additionally or alternatively be configured to communicate using one or more wired communication technologies, such as Ethernet (IEEE 802.3), Power-line communications (PLC), Multimedia over Coax Alliance (MoCA), and/or fiber optic, but are not limited thereto. For example, an RE 135 can communicate with the GW 120 or another RE 135 via one or more other wired or wireless communication protocols while wirelessly serving one or more clients 140. That is, the backhaul of the RE 135 can be wired (or wireless) while the serving side is wireless. Alternatively, both the backhaul and the serving side can be wireless for example.

Figure 2:
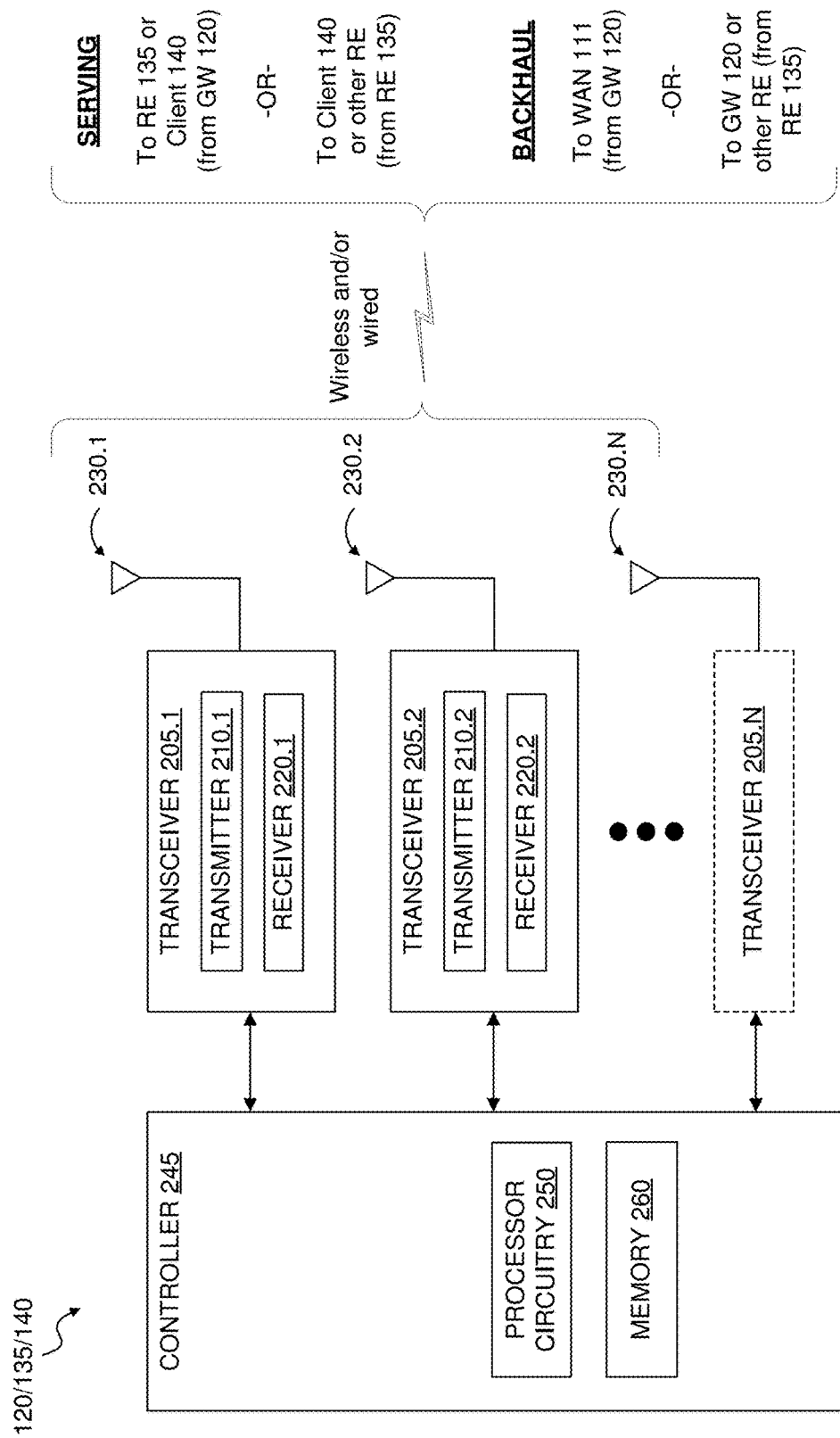
FIG. 2 illustrates exemplary aspects of a gateway, client, and/or range extender.

FIG. 2 illustrates a communication device 200 according to an exemplary aspects of the present disclosure. The communication device 200 can represent exemplary aspects of the GW 120, RE 135, and/or client 140. In an exemplary aspect, the communication device 200 can also represent the WAN 111.

In an exemplary aspect, the communication device 200 is configured to transmit and/or receive wireless and/or wired communications via one or more wireless and/or wired technologies. For example, the communication device 200 can be configured for wireless communications conforming to the IEEE 802.11 specification, but is not limited thereto.

The communication device 200 can be configured to communicate with one or more other communication devices. For example, as illustrated in FIG. 1, an RE 135 can communicate with one or more other REs 135 and/or the GW 120.

The communication device 200 can include a controller 245 communicatively coupled to one or more transceivers 205. The transceiver(s) 205 can be configured to transmit and/or receive wireless and/or wired communications via one or more wireless and/or wired technologies. The transceiver 205 can include processor circuitry that is configured for transmitting and/or receiving wireless and/or wired communications conforming to one or more wireless and/or wired protocols. For example, the transceiver 205 can include a transmitter 210 and a receiver 220 configured for transmitting and receiving wireless communications, respectively, via one or more antennas 230. The transmitter 210 and receiver 220 can additionally or alternatively be configured for wired communications.

In an exemplary aspect, one or more of the transceivers 205 is an IEEE 802.11 transceiver configured to wireless communicate using a protocol defined in the IEEE 802.11 standard, such as IEEE 802.11ac, but is not limited thereto. In an exemplary aspect, a first set of one or more of the transceivers 205 can be configured to operate a first frequency band and a second set of one or more of the transceivers 205 can be configured to operate a second frequency band different from the first frequency band. In a non-limited example, the transceiver 205.1 can operate at 2.4 GHz while the transceiver 205.2 operates at 5 GHz. In an exemplary aspect, the transceivers 205 may operate in the same channel or in adjacent channels. In an exemplary aspect, the transceivers 205 operate in the same channel or in adjacent channels, but not concurrently.

In an exemplary aspect, one or more of the transceivers 205 can operate as serving transceiver configured to communicate (e.g., serve) one or more lower-level devices lower in the hierarchy (e.g., clients 140), while one or more other transceivers 205 can operate as a backhaul transceiver communicating with one or more higher-level components of the system 100, such as another RE 135, GW 120, or WAN 111. In one or more aspects, a single transceiver 205 can operation as both the serving and backhaul transceiver. The serving and backhaul communications can use the same or different frequency bands.

In exemplary aspects, the transceiver(s) 205 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 230 may include an integer array of antennas, and that the antennas may be capable of both transmitting and receiving wireless communication signals. In aspects having two or more transceivers 205, the two or more transceivers 205 can have their own antenna 230, or can share a common antenna (e.g., via a duplexer).

The controller 245 can include processor circuity 250 that is configured to control the overall operation of the communication device 200, such as the operation of the transceiver(s) 205. The processor circuitry 250 can be configured to control the transmitting and/or receiving of wireless/wired communications via the transceiver(s) 205, and/or perform one or more baseband processing functions (e.g., media access control (MAC), encoding/decoding, modulation/demodulation, data symbol mapping; error correction, etc.). The processor circuitry 250 can be configured to run one or more applications and/or operating systems; power management (e.g., battery control and monitoring); display settings; volume control; and/or user interactions via one or more user interfaces (e.g., keyboard, touchscreen display, microphone, speaker, etc.).

In an exemplary aspect, the controller 245 is configured to control the communication device 200 to perform one or more network control operations in exemplary aspects when the communication device 200 (as GW 120) includes the network controller 125. As described above and in more detail below, the network controller 125 can be implemented within, for example, the gateway 120 and/or within one or more other devices (e.g., network 105, RE(s) 135, client(s) 140). The network control operations can include management and control of the placement of one or more RE(s) 135 (and/or other devices), including determining the position (e.g., optimal position) based on the analysis of one or more wireless characteristics. For example, the network control operations can include controlling one or more devices (e.g., RE 135, clients 140) to perform one or more measurement operations to determine measurement information associated with one or more wireless characteristics, and to provide the measurement information to the network controller 125.

The controller 245 can further include a memory 260 that stores data and/or instructions, where when the instructions are executed by the processor circuitry 250, controls the processor circuitry 250 to perform the functions described herein. In an exemplary aspect, the memory 260 can store measurement information obtained from one or more measurements, such as a measurement of path loss, received signal strength indicator (RSSI), and/or one or more other wireless characteristics as would be understood by one of ordinary skill in the art.

The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

In one or more exemplary aspects where the communication device 200 represents a gateway 120 or RE 135, the communication device 200 can be configured to communicate with one or more clients 140. An RE configured communication device 200 can be configured to communicate with the gateway 120, one or more other REs 135 and/or one or more clients 140 to extend the range of the gateway(s) 120. In this example, the communication device 200 can configure at least one transceiver to operate as a backhaul transceiver to communicate with the gateway 120 (and one or more intervening REs 135) and configure at least one other transceiver as a serving transceiver to serve one or more clients 140 and/or one or more other downstream REs 135. In some aspects, a single transceiver can be used and multiplexed between backhaul and serving functions. In some aspects, a single transceiver can simultaneously perform backhaul and serving functions.

Figure 4A:
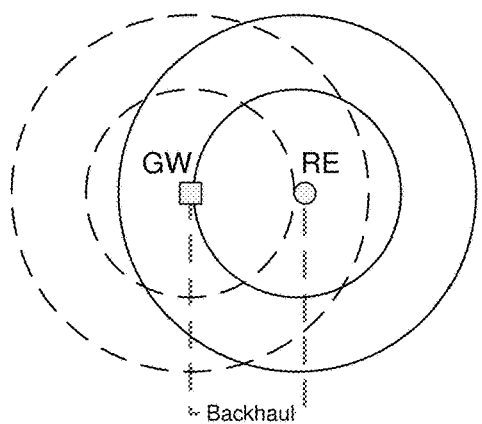
FIGS. 4A-4C illustrate example gateway and range extender deployments according to exemplary aspects of the present disclosure.
Figure 4B:
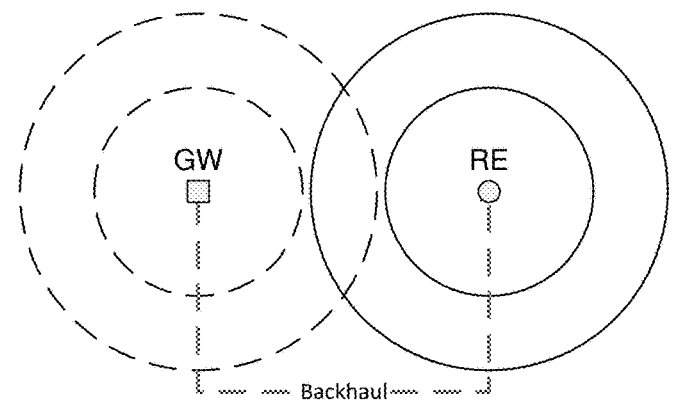
Figure 4C:
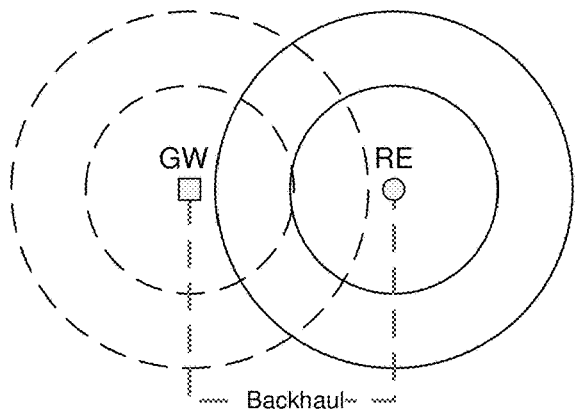

Examples deployments of the GW 120 and an RE 135 in which the RE 135 extends the range of the GW 120 according to exemplary aspects of the present disclosure are illustrated in FIGS. 4A-4C. The GW 120 is connected to the RE 135 via a wireless and/or wired backhaul connection.

The wireless range of the GW 120 is illustrated by two concentric dashed circles, where the service provided by the GW 120 decreases as the distance from the GW 120 increases. For example, the GW 120 can provide good service within the inner circle, marginal service between the outer circle and the inner circle, and bad or no service outside the outer circle. Similarly, the wireless range of the RE 135 is illustrated by two concentric solid circles, where the service provided by the RE 135 decreases as the distance from the RE 135 increases. FIG. 4A shows an example deployment where the RE 135 is positioned too close to the GW 120 (e.g., conflicts and/or interference between the GW 120 and RE 135 may occur), while FIG. 4B illustrates an example deployment where the RE 135 is positioned too far from the GW 120 and an area of only marginal service exists between the GW 120 and RE 135. FIG. 4C illustrates an optimal deployment where good service is provided throughout the distance between the GW 120 and the RE 135.

Figure 3:
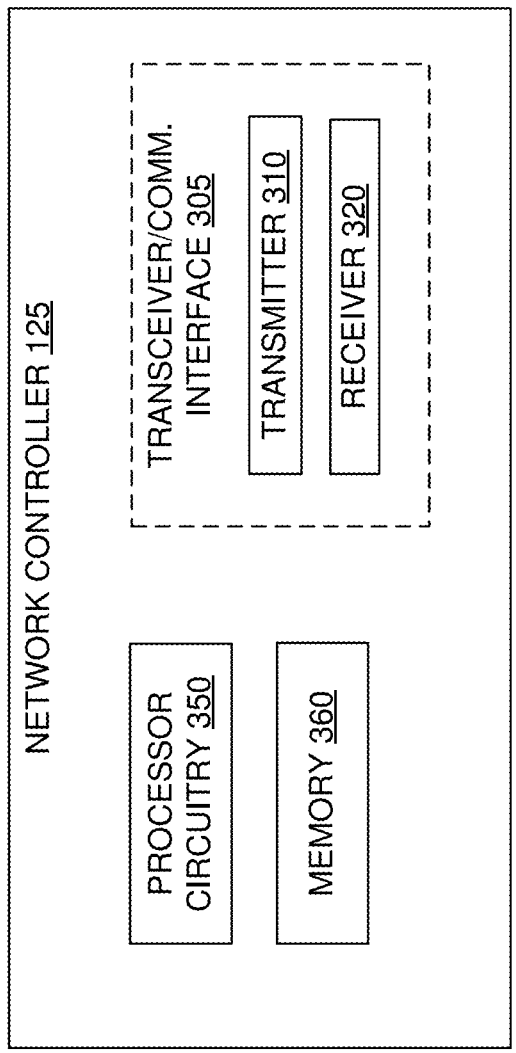
FIG. 3 illustrates a communication manager according to an exemplary aspect of the present disclosure.

FIG. 3 illustrates a network controller 125 according to an exemplary aspect of the present disclosure. The network controller 125 can be configured to manage and control placement of one or more REs 135 (and/or other components, such as other GWs) within the communication system 100. In an exemplary aspect, the network controller 125 is configured to determine locations for placement of one or more REs 135 as well as to increase and/or optimize performance of the placed REs 135 and/or one or more other nodes (GW, RE).

In an exemplary aspect, the network controller 125 can be configured to receive measurement information associated with one or more wireless characteristics from one or more clients 140, the GW 120 (and/or one or more other GWs), and/or one or more REs. The network controller 125 can be configured to determine locations (e.g., optimal locations) for the placement of one or more components (e.g., one or more REs 135) within the communication system environment based on the measurement information. In this example, the network controller 125 can analyze the measurement information (e.g., calculate a placement score) and determine the placement location(s) based on the analyzed measurement information (e.g., placement score). In an exemplary aspect, the network controller 125 can generate position information (also referred to as placement control information) indicative of the location for placement of one or more REs 135 (and/or GWs 120) and provide the position information to the components. The position information can control the component(s) to select the position identified by the position information.

The network controller 125 can be configured to control the RE(s) 135 (e.g., REs currently deployed in the system) and/or the GW 120 to obtain measurement information (e.g., measure wireless characteristics such as path loss, throughput, signal strength, etc. between a wireless client 140, and to provide the measurement information to the network controller 125. The network controller 125 can additionally or alternatively control one or more clients 140 to obtain measurement information associated with one or more wireless characteristics and provide the measurement information to the network controller 125. In an exemplary aspect, an application running on the RE 135, GW 120, and/or client 140 can measure the wireless characteristics to obtain the measurement information. The measurement of the wireless characteristics can be based on instructions (control information) from the network controller 125 and/or independent of instructions from the network controller 125.

The network controller 125 can include processor circuitry 350 and memory 360. In an exemplary aspect, the network controller 125 can also include one or more transceivers 305 (or other communication interfaces). As described above, the network controller 125 can be implemented within, for example, the GW 120. In these exemplary aspects, the network controller 125 does not require its own transceiver 305 and can use one or more transceivers of the GW 120. However, the network controller 125 can include one or more transceivers 305 even when hosted within another component (e.g., so that the network controller 125 can have a dedicated transceiver). In exemplary aspects where the network controller 125 is implemented in, for example, the core network 105 (or distributed among several components), the network controller 125 can include the transceiver(s) 305 to communicate with the GW 120, REs 135 and/or clients 140, but is not limited thereto.

The processor circuitry 350 can be configured to control the overall operation of the network controller 125, including managing and controlling placement of one or more REs 135 (and/or other components, such as other GWs) within the communication system. In exemplary aspects where the network controller 125 includes one or more transceivers 305, the processor circuitry 350 can be configured to control the operation of the transceiver(s) 305. For example, the processor circuitry 350 can be configured to control the transmitting and/or receiving of wireless/wired communications via the transceiver(s) 305, and/or perform one or more radio frequency, intermediate frequency, and/or baseband frequency processing functions.

The transceiver(s) 305 can be configured to transmit and/or receive wireless and/or wired communications via one or more wireless and/or wired technologies. The transceiver 305 can include processor circuitry that is configured for transmitting and/or receiving wireless and/or wired communications conforming to one or more wireless and/or wired protocols. For example, the transceiver 305 can include a transmitter 310 and a receiver 320 configured for transmitting and receiving wireless communications, respectively, via one or more antennas 330. The transmitter 310 and receiver 320 can additionally or alternatively be configured for wired communications.

The memory 360 can stores data and/or instructions, where when the instructions are executed by the processor circuitry 350, controls the processor circuitry 350 to perform the functions described herein. In an exemplary aspect, the memory 206 can store measurement information obtained from one or more measurements, such as a measurement of path loss, received signal strength indicator (RSSI), and/or one or more other wireless characteristics as would be understood by one of ordinary skill in the art. The memory 360 can include a database configured to store the measurement information. The memory 360 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 360 can be non-removable, removable, or a combination of both.

The operation of the network controller 125, including the operation of the processor circuitry 350, is described in more detail below with reference to FIGS. 5 and 6.

Figure 5:
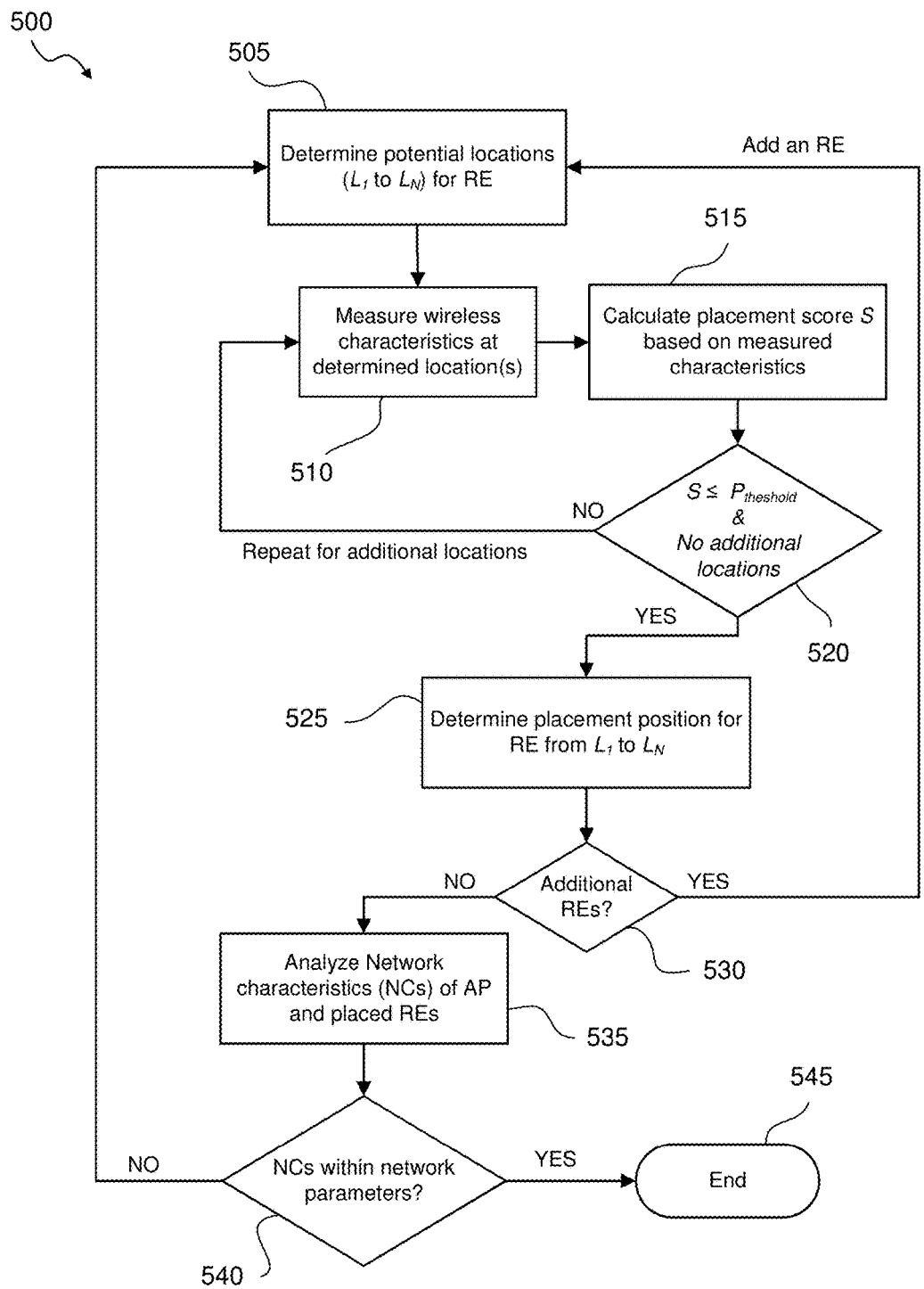
FIG. 5 illustrates a flowchart of a communication management method to determine deployment locations of one or more communication devices according to an exemplary aspect of the present disclosure.
Figure 6:
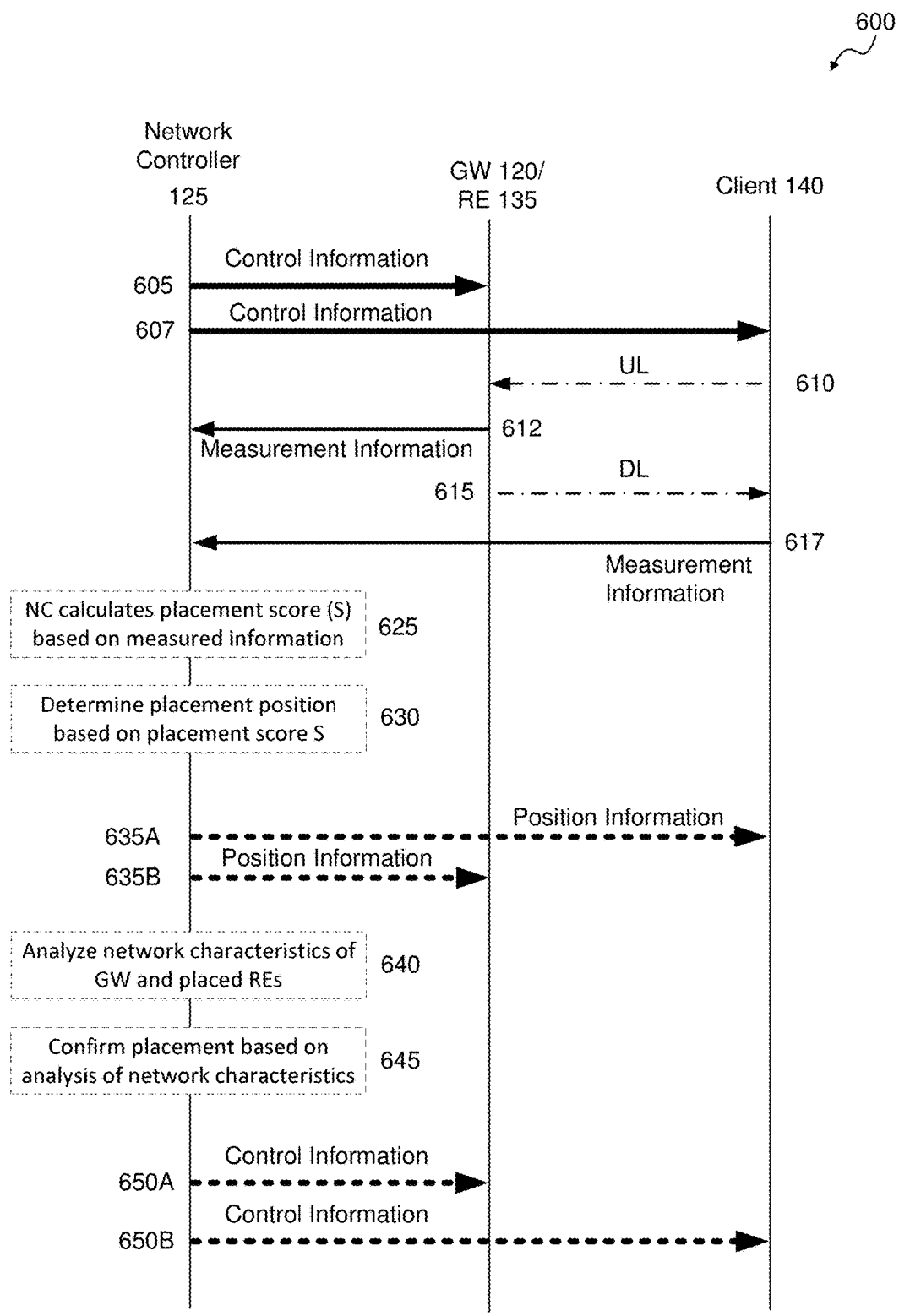
FIG. 6 illustrates a flowchart of a communication management method to determine deployment locations of one or more communication devices according to an exemplary aspect of the present disclosure.

FIGS. 5 and 6 illustrate flowcharts 500 and 600, respectively, of communication management methods to determine deployment locations of one or more communication devices according to exemplary aspects of the present disclosure. The operation of the network controller 125 and components (e.g., GW 120, RE 135, and Clients 140) of the communication system 100 according to exemplary aspects of the present disclosure will be described with reference to the flowcharts 500 and 600. Although the communication management methods are described using the placement of one or more REs 135, the methods are not limited thereto and are applicable to the placement of other communication devices as would be understood by one of ordinary skill in the art. The flowcharts are described with continued reference to FIGS. 1-4C. The operations of the methods are not limited to the order described below, and the various operations may be performed in a different order. Further, two or more operations of the method may be performed simultaneously with each other, and/or a single operation may be performed in multiple sub-operations.

The method of flowchart 500 begins at operation 505, where potential locations for placement of an RE 135 (or other communication device) are determined. In an exemplary aspect, the network controller 125 can be configured to measure one or more wireless characteristics (e.g., path loss, signal strength, spectrum availability, throughput, etc.) of the communication system 100, including measuring one or more wireless characteristics with respect to the GW 120, one or more clients 140, one or more REs 135, and/or other GWs 120 present within the system 100. For example, the network controller 125 can measure and collect measurement information associated with the wireless characteristic(s) (e.g., pathloss, supported bands, network congestion) of the system 100 and with respect to one or more devices within the system 100.

In an exemplary aspect, the network controller 125 can control the devices (GW(s) 120, RE(s) 135, and/or clients 140) to measure one or more wireless characteristics to generate measurement information, and to provide the measurement information to the network controller 125. In an exemplary aspect, with reference to FIG. 6, the network controller 125 can control the GW 120, one or more REs 135 and/or one or more clients 140 to measure one or more wireless characteristics based on control information generated and provided to the GW 120 and/or RE(s) 135 (Operation 605) and/or control information generated and provided to the client(s) 140 (Operation 607). The measurements can be measurements of communications between, for example, a client 140 and one or more REs 135 and/or GW 120. In some aspects, the measured wireless characteristics can be provided to the network controller 125, and the network controller 125 can determine the measurement information based on the provided wireless characteristics. Based on the measurement information, the network controller 125 can determine one or one potential locations for placement of a new RE 135 within the system 100.

Additionally or alternatively, in an exemplary aspect, the locations for placement of an RE 135 can be determined based on the geography of the system 100. For example, the location can be selected based on the physical layout (e.g., rooms within a building) and/or other suitability considerations (e.g., availability of a power source at the location, availability to mount the RE at the location, etc.). In an exemplary aspect, the potential locations can be determined based on the geography (e.g., physical layout of the area in which the REs are to be deployed) with or without the measurement of wireless characteristics.

In an exemplary aspect, the network controller 125 can generate control information (e.g., a control signal) and provide the control information to, for example, a client 140 (and/or an RE 135) that controls the client 140 (and/or RE 135) to indicate the location on the client 140 (and/or 135). For example, the client 140 (and/or RE 135) can generate a notification (e.g., visual and/or audio) that identifies the location (e.g., on the display of the client 140/RE 135). Based on the notified location, the client (and/or RE 135) can be moved to the corresponding location. For example, using the notification, a user of the client 140 (and/or RE 135) can move to the location with the client 140 (and/or RE 135).

After operation 505, the flowchart 500 transitions to operation 510, where one or more measurements of one or more wireless characteristics (e.g., path loss, signal strength, spectrum availability, throughput, etc.) are performed at the determined location. In an exemplary aspect, with reference to FIG. 6, the network controller 125 can control the GW 120, one or more REs 135 and/or one or more clients 140 to measure one or more wireless characteristics based on control information generated and provided to the GW 120 and/or RE(s) 135 (Operation 605) and/or control information generated and provided to the client(s) 140 (Operation 607). The measurements can be measurements of communications between, for example, a client 140 and one or more REs 135 and/or GW 120.

For example, the GW 120 and/or RE(s) 135 can measure one or more uplink communications 610 from the client(s) 140 to the GW 120 and/or REs 135. In this example, the GW 120 and/or RE 135 can be controlled to listen for and measure communications from the client 140 based on the control information of operation 605 and the client 140 can be controlled (control information 607) to transmit one or more communications to the GW 120 and/or RE 135 to be measured. For example, the client 140 can transmit one or more uplink communications 610 that is received and measured by the GW 120 and/or RE 135. In an exemplary aspect, one or more wireless characteristics are measured or otherwise determined based on the uplink communication(s) 610.

In an exemplary aspect, the GW 120 and/or RE 135 can generate measurement information based on the measured wireless characteristics, and can provide the measurement information to the network controller 125 (Operation 612).

Similarly, the client 140 can measure one or more downlink communications 615 from the GW 120 and/or RE(s) 135 to the client(s) 140. In this example, the client 140 can be controlled to listen for and measure communications from the GW 120 and/or RE(s) 135 based on the control information of operation 607 and the GW 120 and/or RE(s) 135 can be controlled (control information 605) to transmit one or more communications to the client 140 to be measured. For example, the GW 120 and/or RE 135 can transmit one or more downlink communications 615 that is received and measured by the client 140. In an exemplary aspect, one or more wireless characteristics are measured or otherwise determined based on the downlink communication(s) 615.

In an exemplary aspect, the client 140 can generate measurement information based on the measured wireless characteristics, and can provide the measurement information to the network controller 125 (Operation 617).

After operation 510, the flowchart 500 transitions to operation 515, where a placement score S is calculated or otherwise determined based on the measurement information (Operation 625 in FIG. 6). For example, the network controller 125 can be configured to calculate or otherwise determine a placement score S based on the measurement information provided to the network controller 125 from the GW 120 and/or RE 135 (Operation 612) and/or from the client 140 (Operation 617).

In an exemplary aspect, the network controller 125 can calculate the placement score S based on the service level required by one or more devices of the system 100, the number of devices (e.g., clients 140) that have good service (and/or potential good service) from the GW 120 and/or REs 135, and/or predicted or estimated throughput of the backhaul between the RE 135 to be placed and the GW 120.

In an exemplary aspect, the calculation of the placement score S for each location i of the locations $L_I$ to $L_N$ satisfies the following equation:

$S_i$=Minimal(Service Quality,Overlap,Backhaul)

Where:
Service Quality is a ratio of devices (e.g., REs 135 and/or clients 140) below a required service level threshold
Overlap is a ratio of devices that have potential good service from GW 120 and/or one or more REs 135
Backhaul is a predicted or estimated throughput of the backhaul link between the GW 120 and one or more REs 135 (e.g., the RE to be placed).

After operation 515, the flowchart 500 transitions to operation 520, where the placement score S is compared with a placement threshold ($P_{threshold}$), and/or it is determined if measurements of wireless characteristics are to be measured at one or more additional locations ($L_I$ to $L_N$). If the placement score S is less than or equal to the placement threshold ($P_{threshold}$), and no additional locations for measurement are needed (YES at operation 520), the flowchart 500 transitions to operation 525. Otherwise (NO at operation 520), the flowchart 500 returns to operation 510 to perform one or more measurements of one or more wireless characteristics at the additional location. In an exemplary aspect, the network controller 125 is configured to compare the placement score S with a placement threshold ($P_{threshold}$) and determine if measurements of wireless characteristics at one or more additional locations are to be performed. If the placement score S is greater than the placement threshold ($P_{threshold}$) and no additional locations have been determined (at operation 505), the network controller 125 can control the client 140 and/or RE 135 to be placed to move to another location and the flowchart 500 can return to operation 510 and the measurements of the wireless characteristic(s) can be repeated at operation 510.

After operation 520, the flowchart 500 transitions to operation 525, where the placement position (e.g., from locations $L_I$ to $L_N$) for the RE 135 is determined (Operation 630 in FIG. 6). The determination can be based on the placement score S and the placement threshold ($P_{threshold}$) (e.g., based on the comparison of the placement score S and the placement threshold ($P_{threshold}$)). In an exemplary aspect, the network controller 125 is configured to determine the placement position (e.g., from locations $L_I$ to $L_N$) for the RE 135 based on the placement score S and the placement threshold ($P_{threshold}$).

After operation 525, the flowchart 500 transitions to operation 530, where it is determined if additional REs 135 (or other devices) are to be positioned within the system 100. For example, the network controller 125 can determine if one or more additional REs 135 are to be placed at a corresponding location. If one or more additional REs 135 are to be positioned (YES at operation 530), the flowchart 500 returns to operation 505. Otherwise (NO at operation 530), the flowchart 500 transitions to operation 535.

In an exemplary aspect, the network controller 125 can be configured to generate position information that identifies the determined location for the placement of the RE 135, and can provide the position information to a client 140 (e.g., the client of the user associated with the RE 135) and/or to the GW 120 and/or RE 135 (Operations 635A and B in FIG. 6). In an exemplary aspect, the position information includes control data that controls the receiving device to indicate the position (e.g., can control the client 140 to indicate the location on the client 140). For example, the client 140 can generate a notification (e.g., visual and/or audio) that identifies the location (e.g., on the display of the client 140) based on the received position information. In an exemplary aspect, a user of the client 140 uses the notified location to position the RE 135 at the identified location. For example, the display on the client 140 can indicate the position for placement of the RE 135 with respect to the current location of the client 140.

After operation 530, the flowchart 500 transitions to operation 535, where one or more measurements of one or more wireless characteristics (e.g., path loss, signal strength, spectrum availability, throughput, etc.) of the system 100 are performed (Operation 640 in FIG. 6). For example, given the newly placed RE 135, the wireless characteristics of the overall system 100 can be measured. In this example, wireless characteristics of the GW 120 and/or the REs 135 can be measured, and in some aspects, the measurements can be based on communications between one or more clients 140. In an exemplary aspect, the network controller 125 can control the GW 120, one or more REs 135 and/or one or more clients 140 to measure one or more wireless characteristics. The measurements can be performed in response to control information generated and provided to the GW 120, RE(s) 135 and/or client(s) 140 that controls the corresponding device(s) to perform one or more measurement operations.

After operation 535, the flowchart 500 transitions to operation 540, where it is determined whether the measured wireless characteristics of the system 100 (i.e., network characteristics) are within one or more network parameters (Operation 645 in FIG. 6). For example, the measured wireless characteristics can be compared to one or network parameter thresholds to determine if the wireless characteristics are within the network parameter(s). In an exemplary aspect, the network controller 125 can be configured to compare the measured wireless characteristics to one or network parameter thresholds to determine if the measured wireless characteristics are within the network parameter(s). If the measured wireless characteristics are within the network parameter(s) (YES at operation 540), it is confirmed that the placed RE 135 has been positioned in a suitable (e.g., good, optimal, etc.) location and the flowchart 500 transitions to operation 545 where the flowchart 500 ends. Otherwise (NO at operation 540), the flowchart 500 returns to operation 505 where the flowchart 500 can be repeated to determine a new location for placement of the RE 135.

In an exemplary aspect, and with reference to FIG. 6, the network controller 125 can generate and provide control information at operation 650 that indicates whether the location at which the RE 135 has been placed is a good location or that the RE 135 should be repositioned (e.g., the flowchart 500 is repeated). In an exemplary aspect, the control information controls the receiving device to indicate that the position is a suitable position or that the RE 135 should be repositioned (e.g., can control the client 140 to indicate the status of the current placement location on the client 140). For example, the client 140 can generate a notification (e.g., visual and/or audio) that identifies the status of the placement location (e.g., on the display of the client 140) based on the received control information.

EXAMPLES

Example 1 is a network controller operable in a communication network, the network controller comprising: a communication interface configured to communicate with a first communication device of the communication network; and processor circuitry configured to: generate control information and to provide the control information, using the communication interface, to the first communication device to instruct the first communication device to measure one or more wireless characteristics to generate measurement information; determine a placement score based on the measurement information; and determine a placement location of a second communication device within the communication network based on the placement score.

In Example 2, the subject matter of Example 1, wherein the placement location corresponds to a location within the communication network in which the second communication device is to be positioned within the communication network.

In Example 3, the subject matter of Example 1, wherein the processor circuitry is further configured to provide the placement location to the first communication device to notify the first communication of the placement location in which the second communication device is to be positioned within the communication network.

In Example 4, the subject matter of Example 1, wherein the processor circuitry is further configured to analyze one or more network characteristics of the communication network including the second communication device.

In Example 5, the subject matter of Example 4, wherein the network characteristics are based on one or more communications with the second communication device at the placement location.

In Example 6, the subject matter of Example 1, wherein the communication network includes a third communication device, the third communication device being configured as an access point configured to serve the first communication device and the second communication device.

In Example 7, the subject matter of Example 6, wherein the second communication device is a range extender that is configured to extend a wireless range of the third communication device.

In Example 8, the subject matter of Example 7, wherein the first communication device is mobile communication device.

In Example 9, the subject matter of Example 6, wherein the network controller is comprised within the third communication device.

In Example 10, the subject matter of Example 6, wherein the network controller is comprised within a core network supporting the communication network.

In Example 11, the subject matter of Example 6, wherein the processor circuitry is further configured to: generate second control information and to provide the second control information, using the communication interface, to the third communication device to instruct the third communication device to measure one or more wireless characteristics to generate second measurement information; and determine the placement score based on the measurement information and the second measurement information.

In Example 12, the subject matter of Example 1, wherein: the network controller is configured to receive the measurement information from the first communication device, and the network controller further comprises a memory that stores the received measurement information.

In Example 13, the subject matter of Example 1, wherein the wireless characteristics comprise: path loss between the first communication device and an access point serving the first communication device; and/or a signal strength of the first communication device.

In Example 14, the subject matter of Example 1, wherein the first communication device and the second communication device are configured to communicate using one of more Institute of Electrical and Electronics Engineers' (IEEE) 802.11 communication protocols.

Example 15 is a method adapted for communication network management of a communication network comprising one or more communication devices, the method comprising: controlling a first communication device of the communication network to measure one or more wireless characteristics to generate measurement information; determining a placement score based on the measurement information; and determining a placement location of a second communication device within the communication network based on the placement score.

In Example 16, the subject matter of Example 15, wherein the placement location corresponds to a location within the communication network in which the second communication device is to be positioned within the communication network.

In Example 17, the subject matter of Example 15, further comprising providing the placement location to the first communication device to notify the first communication of the placement location in which the second communication device is to be positioned within the communication network.

In Example 18, the subject matter of Example 15, further comprising analyzing one or more network characteristics of the communication network including the second communication device.

In Example 19, the subject matter of Example 18, wherein the network characteristics are based on one or more communications with the second communication device at the placement location.

In Example 20, the subject matter of Example 15, wherein: the communication network includes a third communication device, the third communication device being configured as an access point configured to serve the first communication device and the second communication device; the second communication device is a range extender that is configured to extend a wireless range of the third communication device; and the first communication device is mobile communication device.

In Example 21, the subject matter of Example 20, wherein the access point comprises a network controller that is configured to: control the first communication device to measure the one or more wireless characteristics to generate the measurement information; determine the placement score based on the measurement information; and determine the placement location of the second communication device based on the placement score.

In Example 22, the subject matter of Example 20, further comprising: controlling the third communication device to measure one or more wireless characteristics to generate second measurement information, wherein determining the placement score is further based on the second measurement information.

Example 23 is a network controller operable in a communication network adapted to serve one or more communication devices and having an access point supporting the communication network, the network controller comprising: a communication interface configured to communicate with a first communication device and a second communication device of the communication network, the second communication device being a range extender that is configured to extend a wireless range of the access point; and processor circuitry configured to: control the first communication device and the access point to measure one or more wireless characteristics to generate first and second measurement information, respectively; determine a placement score based on the first measurement information and the second measurement; determine a placement location of the ranger extender within the communication network based on the placement score; and provide the placement location to the first communication device and/or the range extender to indicate the placement location in which the range extender is to be positioned within the communication network.

In Example 24, the subject matter of Example 23, wherein the network controller is comprised within the access point.

In Example 25, the subject matter of any of Examples 1-5, wherein the communication network includes a third communication device, the third communication device being configured as an access point configured to serve the first communication device and the second communication device.

In Example 26, the subject matter of Example 25, wherein the second communication device is a range extender that is configured to extend a wireless range of the third communication device.

In Example 27, the subject matter of Example 26, wherein the first communication device is mobile communication device.

In Example 28, the subject matter of Example 25, wherein the network controller is comprised within the third communication device.

In Example 29, the subject matter of Example 25, wherein the network controller is comprised within a core network supporting the communication network.

In Example 30, the subject matter of Example 25, wherein the processor circuitry is further configured to: generate second control information and to provide the second control information, using the communication interface, to the third communication device to instruct the third communication device to measure one or more wireless characteristics to generate second measurement information; and determine the placement score based on the measurement information and the second measurement information.

In Example 31, the subject matter of any Examples 1-11, wherein: the network controller is configured to receive the measurement information from the first communication device, and the network controller further comprises a memory that stores the received measurement information.

In Example 32, the subject matter of any Examples 1-12, wherein the wireless characteristics comprise: path loss between the first communication device and an access point serving the first communication device; and/or a signal strength of the first communication device.

In Example 33, the subject matter of any Examples 1-13, wherein the first communication device and the second communication device are configured to communicate using one of more Institute of Electrical and Electronics Engineers' (IEEE) 802.11 communication protocols.

Example 34 is an apparatus comprising means to perform the method as described in any of Examples 15-22.

Example 35 is a wireless access point comprising means to perform the method as descried in any of Examples 15-19.

Example 36 is a computer program product embodied on a computer-readable medium comprising program instructions, when executed, causes a processor to perform the method of any of Examples 15-22.

Example 37 is an apparatus substantially as shown and described.

Example 38 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to IEEE 802.11 wireless communications and can be applied to other non-cellular or cellular (e.g., LTE, 5G) communication protocols as would be understood by one of ordinary skill in the relevant arts. Further, exemplary aspects are not limited to wireless networks and can be used or implemented in one or more wired networks using one or more well-known wired specifications and/or protocols.

What is claimed is:

1. A network controller operable in a communication network, the network controller comprising:
   a communication interface configured to communicate, via the communication network, with a first communication device and a second communication device of the communication network; and
   processor circuitry configured to:
      generate an instruction and provide the instruction, using the communication interface, to the first communication device to instruct the first communication device to measure one or more wireless characteristics to generate measurement information and provide the generated measurement information to the network controller via the communication network;
      determine a placement score based on the measurement information received from the first communication device and a ratio of communication devices of the communication network that are below a required service level threshold; and
      determine a placement location of the second communication device within the communication network based on the placement score.

2. The network controller of claim 1, wherein the placement location corresponds to a location within the communication network in which the second communication device is to be positioned within the communication network.

3. The network controller of claim 1, wherein the processor circuitry is further configured to provide the placement location to the first communication device to notify the first communication of the placement location in which the second communication device is to be positioned within the communication network.

4. The network controller of claim 1, wherein the processor circuitry is further configured to analyze one or more network characteristics of the communication network including the second communication device.

5. The network controller of claim 4, wherein the network characteristics are based on one or more communications with the second communication device at the placement location.

6. The network controller of claim 1, wherein the communication network includes a third communication device, the third communication device being configured as an access point configured to serve the first communication device and the second communication device.

7. The network controller of claim 6, wherein the second communication device is a range extender that is configured to extend a wireless range of the third communication device.

8. The network controller of claim 7, wherein the first communication device is mobile communication device.

9. The network controller of claim 6, wherein the network controller is comprised within the third communication device.

10. The network controller of claim 6, wherein the network controller is comprised within a core network supporting the communication network.

11. The network controller of claim 6, wherein the processor circuitry is further configured to:
    generate a second instruction and to provide the second instruction, using the communication interface, to the third communication device to instruct the third communication device to measure one or more wireless characteristics to generate second measurement information; and
    determine the placement score based on the measurement information and the second measurement information.

12. The network controller of claim 1, wherein:
    the network controller further comprises a memory that stores the received measurement information.

13. The network controller of claim 1, wherein the wireless characteristics comprise:
    path loss between the first communication device and an access point serving the first communication device; and/or
    a signal strength of the first communication device.

14. The network controller of claim 1, wherein the first communication device and the second communication device are configured to communicate using one of more Institute of Electrical and Electronics Engineers' (IEEE) 802.11 communication protocols.

15. A communication network management method for a communication network comprising a network controller and first and second communication devices, the method comprising:
    providing, by the network controller via the communication network, a control signal to a first communication device of the communication network to control the first communication device to measure one or more wireless characteristics to generate measurement information and to provide the generated measurement information to the network controller via the communication network;
    determining, by the network controller, a placement score based on the measurement information received from the first communication device and a ratio of communication devices of the communication network that are below a required service level threshold; and
    determining, by the network controller, a placement location of the second communication device within the communication network based on the placement score.

16. The method of claim 15, wherein the placement location corresponds to a location within the communication network in which the second communication device is to be positioned within the communication network.

17. The method of claim 15, further comprising providing the placement location to the first communication device via the communication network to notify the first communication of the placement location in which the second communication device is to be positioned within the communication network.

18. The method of claim 15, further comprising analyzing one or more network characteristics of the communication network including the second communication device.

19. The method of claim 18, wherein the network characteristics are based on one or more communications with the second communication device at the placement location.

20. The method of claim 15, wherein:
    the communication network includes a third communication device, the third communication device being configured as an access point configured to serve the first communication device and the second communication device;
    the second communication device is a range extender that is configured to extend a wireless range of the third communication device; and
    the first communication device is mobile communication device.

21. The method of claim 20, wherein the access point comprises the network controller.

22. The method of claim 20, further comprising:

controlling the third communication device to measure one or more wireless characteristics to generate second measurement information, wherein determining the placement score is further based on the second measurement information.

23. A network controller operable in a communication network for serving one or more communication devices and having an access point supporting the communication network, the network controller comprising:

a communication interface configured to communicate with a first communication device and a second communication device of the communication network, the second communication device being a range extender that is configured to extend a wireless range of the access point; and processor circuitry configured to:

control the first communication device and the access point to measure one or more wireless characteristics to generate first and second measurement information, respectively;

determine a placement score based on the first measurement information received from the first communication device via the communication network, the second measurement, and a ratio of communication devices of the communication network that are below a required service level threshold;

determine a placement location of the range extender within the communication network based on the placement score; and provide the placement location to the first communication device and/or the range extender to indicate the placement location in which the range extender is to be positioned within the communication network.

24. The network controller of claim 23, wherein the network controller is comprised within the access point.

* * * * *